Figure 1:
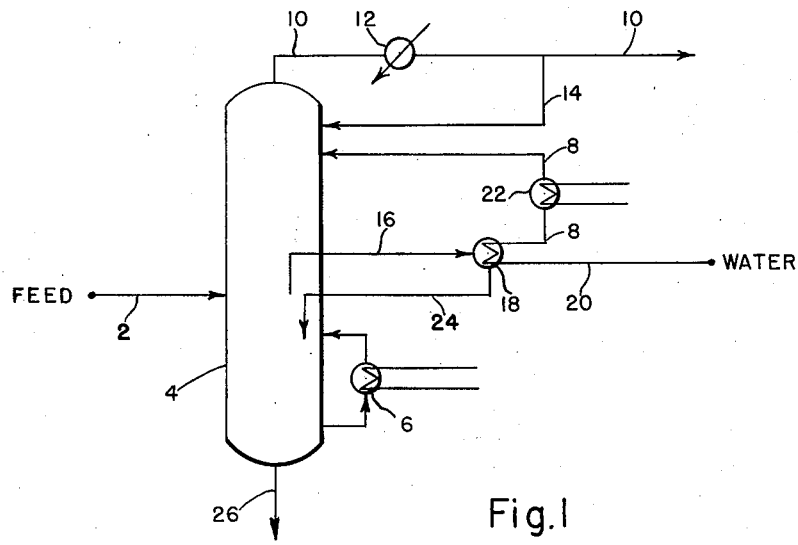

Feb. 23, 1954  H. GREKEL ET AL  2,670,324
EXTRACTIVE DISTILLATION PROCESS
Filed Oct. 28, 1949

Howard Grekel
Benjamin S. Pace
John D. Ireland
INVENTORS

BY *Arthur McIlroy*
ATTORNEY

Patented Feb. 23, 1954

2,670,324

UNITED STATES PATENT OFFICE 2,670,324

EXTRACTIVE DISTILLATION PROCESS

Howard Grekel, Benjamin S. Pace, and John D. Ireland, Tulsa, Okla., assignors to Stanolind Oil and Gas Company, Tulsa, Okla., a corporation of Delaware Application October 28, 1949, Serial No. 124,228

5 Claims. (Cl. 202—39.5)

The present invention relates to a novel improvement in the art of separating the components of various azeotropic or similar mixtures by means of extractive distillation. More particularly, it pertains to a method by which ideal conditions for the separation of the individual components of such mixtures are achieved.

In separating mixtures of close boiling compounds or azeotropic mixtures into their individual components by means of extractive distillation, there exist both maximum and minimum heat input limits within which the column must be operated to secure a satisfactory separation. Primary factors affecting the maximum and minimum heat input are the composition of the feed mixture, the degree of separation desired, and the concentration of extractive agent maintained in the liquid on the plates. The minimum heat input for an extractive distillation is analogous to the minimum reflux ratio concept for conventional distillation in that a certain minimum input of heat (as indicated by the ratio of vapor rising in the column to liquid flowing down the column) is required to secure the necessary fractionating action. The maximum limit on heat input to extractive distillation columns results from the fact that as heat input is increased, the concentration of the extractive agent in the liquid on the plates decreases. This results in decreased relative volatility of the key components with corresponding increased difficulty in separation.

It is an object of our invention to provide an improved method for separating various azeotropic or close boiling mixtures into their individual components by means of extractive distillation of such mixtures, this object being achieved by adjusting conditions to approach the optimum liquid to vapor ratios (hereinafter referred to as L./V.) in both the washing and the stripping sections of the column. It is a further object of our invention to control the L./V. in the stripping and washing sections of the column by effecting condensation of a portion of the vapors present in the column substantially at the point of feed introduction. Two preferred methods of accomplishing this object consist of either regulating the temperature at which the liquid feed is introduced into the column or withdrawing heat from the column in the form of vapors substantially at the level at which the feed is introduced, condensing these vapors by passing them in indirect heat exchange relationship with the extraction solvent or other cooling medium, and returning the resulting condensate to the column at the approximate point of vapor withdrawal. A still further object of our invention is to effect a substantial savings in the number of actual plates required by fractionating columns employed in extractive distillation operations and, at the same time, accomplish a sharp separation of the chemicals present in a given mixture.

We have found that for extractive distillation not only is there a maximum and minimum heat input to the column, but there are independent maximum and minimum heat inputs for both the stripping and washing sections. In general, the optimum heat input for the stripping section will not correspond to the optimum heat input for the washing section, and we have found it desirable, in certain instances, to reduce the heat input into the washing section in order to more closely approach the optimum ratios of liquid to vapor for both sections. Thus, within the limits set by the system and the overall separation to be made, the efficiency of extractive distillation operations can be unexpectedly and materially improved by maintaining a high stripping rate (low L./V.) in the stripping section and a high wash rate (high L./V.) in the washing section of the column. The above-mentioned conditions may be achieved in at least two ways, (1) the feed may be introduced into the column at a point intermediate the washing and stripping sections at a temperature sufficiently below its boiling point to effect a condensation of a portion of the vapors, i. e., preferably from about 10 to about 50 per cent, rising into the upper section of the column, or (2) a limited proportion of the total vapors from the chemical feed tray may be withdrawn from the column, condensed, for example, by passing the vapors in indirect heat exchange relationship with cooling water or with the extraction solvent, and returning the resulting condensate to the column at the approximate point of withdrawal. By either method or by means of a combination of these methods, we have found it possible to operate at the optimum L./V. in both sections. Observance of such conditions results in a substantial decrease in the number of plates required in both sections. However, the manner in which condensation of the feed tray or other vapors is carried out is not regarded as important and forms no part of our invention. While condensation of from about 10 to 50 per cent of such vapors is generally considered desirable, the preferred range of vapor condensation to be effected might be even higher. On the other hand, we have found that by effecting even a slight condensation (less than 10 per cent) of the tray vapors, conditions are provided in both the washing and stripping sections of the column which result in an improvement in the operating efficiency of both of said sections.

Any mixtures of close boiling compounds or azeotropic mixtures that may be conveniently separated by means of extractive distillation in the conventional manner can be separated in accordance with our invention and it is to be strictly understood that the expression "mixtures" appearing in the claims is limited to compositions of such type. Typical of the various mixtures that may be separated into their individual organic compounds are ethanol-ethyl acetate-water, acetone-methanol-water, ethanol-methyl ethyl ketone-water, isopropanol-methyl ethyl ketone-water, ethanol-isopropyl alcohol-water, and methyl ethyl ketone-ethyl acetate-water. Mixtures of the above type containing the indicated components in azeotropic proportions are encountered in the aqueous fraction resulting from the reaction of carbon monoxide with hydrogen in the presence of a promoted fluidized iron catalyst at temperatures of from 450° to 700° F. and pressures ranging from 150 to about 450 p. s. i., and the process of our invention is particularly applicable to the separation of such mixtures into their respective compounds. Mixtures of water soluble chemicals derived from the direct oxidation of hydrocarbons can likewise be efficiently separated in accordance with the process of our invention.

Our invention may be further illustrated by reference to Fig. 1 in which a preferred embodiment thereof is diagrammatically presented. An aqueous mixture of chemicals to be separated is introduced in liquid form through line 2 into a fractionating column 4. The liquid in the base of the column is vaporized by means of heat supplied from reboiler 6 and extractive distillation is effected by countercurrently contacting the rising vapors with a descending water stream introduced above the feed entry point through line 8. The vapors passing upwardly through the descending water stream are withdrawn through line 10 and condenser 12, a portion of the condensate being returned to the column through line 14 while the balance is collected as distillate through line 16. During distillation, a portion of the vapors from the tray or plate on which the aqueous mixtures of chemicals is introduced is withdrawn through line 16 and cooler 18 where it is condensed by heat exchange with solvent water coming from line 20. The solvent water from cooler 18 then passes through line 8 and heater 22 after which it is introduced into column 4. The condensate obtained in cooler 18 is conducted back through line 24 to column 4 at the approximate point of vapor withdrawal. The bottoms fraction is withdrawn through line 26.

Figure 2:
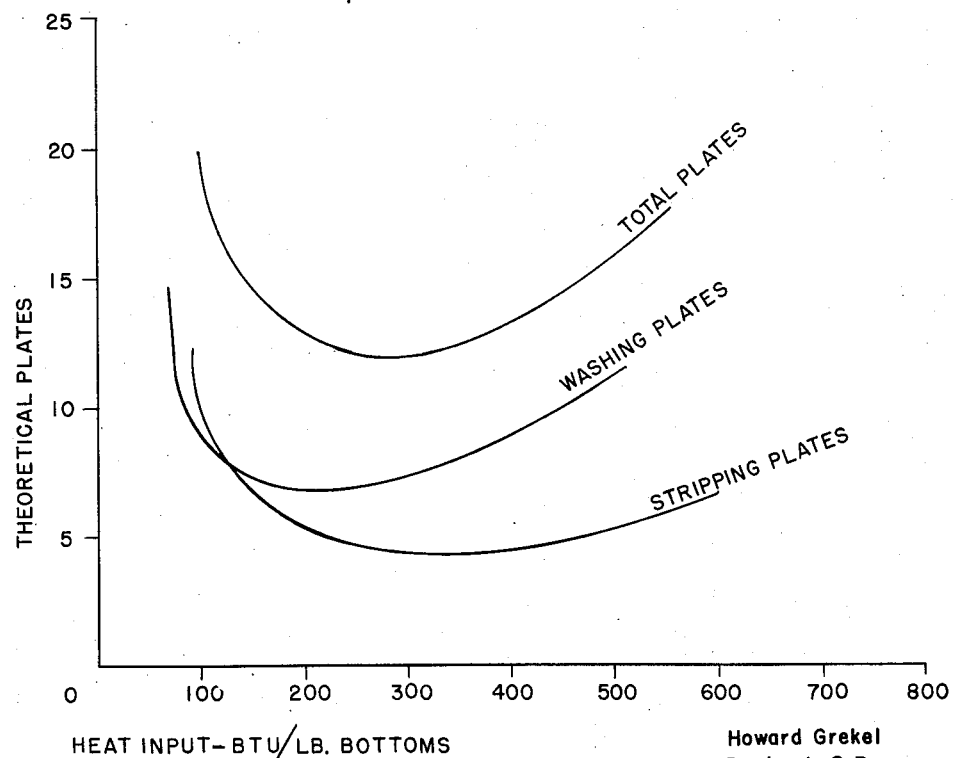

Thus, for example, where it is desired to obtain from a mixture containing 17 mole per cent methyl ethyl ketone, 66 mole per cent ethanol, and 17 mole per cent water, a bottoms product containing 1 mole per cent of methyl ethyl ketone in ethanol and a distillate containing 1 mole per cent ethanol in methyl ethyl ketone, this object may be accomplished by introducing dilution water into the top of the column in an amount sufficient to yield a bottoms containing 90 mole per cent water. The relationship of heat input and the average L./V. in the stripping and washing sections to the number of theoretical plates required for effecting separation of the components of such a system are shown in the table below. This relationship is likewise graphically presented in Fig. 2.

TABLE I

| Heat Input, B. t. u. per lb. Btms. | Average Water Content in Plate Liquid, Mole Per cent | L./V. Average | | Theoretical Plates Required | | |
|---|---|---|---|---|---|---|
| | | Stripping Section | Washing Section | Stripping | Washing | Total |
| 100 | 84.6 | 10.0 | 8.8 | 11.0 | 9.0 | 20.0 |
| 150 | 82.3 | 7.0 | 6.2 | 6.8 | 7.4 | 14.2 |
| 200 | 80.5 | 5.4 | 4.7 | 5.3 | 6.9 | 12.2 |
| 300 | 76.7 | 4.0 | 3.4 | 4.7 | 8.1 | 12.8 |
| 400 | 73.4 | 3.2 | 2.8 | 4.4 | 8.6 | 13.0 |

It is to be noted from the above table, as well as in the accompanying graph, that as heat input is increased, L./V. in both sections decreases. The number of washing plates required reaches a minimum at L./V. of 4.7 whereas the number of stripping plates is still slowly decreasing at L./V. of 3.2. The concentration of water in the plate liquid decreases as heat input is increased. At some heat input beyond 400 B. t. u. per lb. of bottoms the number of plates required in the stripping section also will begin to increase due to the decreased relative volatility resulting from the lessened concentration of water in plate liquid. At heat inputs below 100 B. t. u./lb. of bottoms, plate requirements in both sections rapidly approach infinity. Thus, it may be seen that the minimum plate requirement for the wash section occurs at a higher L./V. than the minimum plate requirement for the stripping section. This principle can be utilized to economic advantage in other cases cited below.

The process of our invention is particularly adapted to extractive distillation operations involving a very dilute feed and may be further illustrated by the specific example which follows.

*Example*

A column charging a feed consisting of 2.5 mole per cent ethanol, 8.0 mole per cent methyl ethyl ketone, and the balance water, produced a distillate containing high purity methyl ethyl ketone and a bottoms containing high purity ethanol. Under these circumstances, more than enough water was present in the feed to permit an easy separation of methyl ethyl ketone from ethanol. In the interest of economy, therefore, it was desired to hold at a minimum the volume of extractive agent (water) introduced at the top of the column to provide the necessary washing action. In such case it has been found highly desirable to cool the feed below its boiling point in order to reduce to a minimum the vapor entering the upper section. Thus, with a column operating at a feed rate of 10,000 lbs. per hour and having a reboiler heat input of 120 B. t. u./lb. of bottoms and a feed of the above composition, the total vapor rising in the base of the column was 44 moles per hour. If the feed were introduced at its boiling point, 202° F., the vapor rising into the upper section would amount to some 64 moles per hour. By cooling the feed to the feed plate temperature, 170° F., the vapor passing into the upper section was reduced by some 30 per cent to 44 moles per hour. For a constant water input at the top of the wash section of 740 lbs. per hour, the cooling of feed permitted a saving of some five actual plates due to the higher L./V. in the washing section. It is also apparent that cooling the feed in this instance reduced the diameter of column required.

The advantages afforded by operating in accordance with the teachings of our invention are further illustrated by the data appearing in the table below. In case A, conventional extractive distillation was employed, while in case B, the improved extractive distillation technique of our invention, as generally illustrated in the above-mentioned drawing, was utilized. The feed mixture selected for treatment in cases A and B consisted of ethanol and isopropyl alcohol in a ratio of 4:1 together with azeotropic water. A separation of this type is difficult to effect, requiring a high concentration of water (95 mole per cent minimum) in the column and a large number of plates. In both cases the chemical feed was introduced at the thirty-eighth plate which, in our opinion, is the optimum feed point location. The distillate obtained in each instance contained less than 1 mole per cent ethanol in isopropyl alcohol and the bottoms contained 1 mole per cent isopropyl alcohol in ethanol. A rectifying section was employed to concentrate the distillate to the azeotropic composition. Dilution water was added to yield a bottoms containing 1 mole per cent total chemicals and net heat input was set at 150 B. t. u. per lb. of bottoms. Under these conditions, case A required a total of 77 actual plates to effect the separation desired. In case B, by condensing 25 per cent of the feed plate vapor and returning the resulting condensate to the approximate point of vapor withdrawal, the wash plate requirements were decreased by 15 per cent. An additional advantage secured by operating in accordance with case B is that the cold dilution water may be preheated by the condensing vapor which supplies about 25 per cent of the heat required to raise this stream to the dilution water tray temperature. The specific results obtained in each case appear as follows:

TABLE II

*Results of tray calculations*

| Case | Average L./V. | | | Reflux Ratio | Actual Plates Required | | | |
|---|---|---|---|---|---|---|---|---|
| | Strip. Sec. | Wash Sec. | Rect. Sec. | | Strip. Sec. | Wash Sec. | Rect. Sec. | Total |
| A | 7.87 | 8.60 | 0.97 | 39.2 | 38 | 30 | 9 | 77 |
| B | 7.87 | 11.4 | 0.96 | 24.0 | 38 | 26 | 9 | 73 |

From the foregoing it will be apparent that the process described herein constitutes an important and distinct advance in the art of extractive distillation; and while the present invention has been described with respect to its applicability to the separation of various aqueous azeotropic mixtures of oxygenated organic chemicals, it may be applied with equal success to nonaqueous azeotropic or other mixtures that are difficult to separate into their individual components by ordinary distillation methods. Thus, for example, the process of our invention may be employed in the separation of complex fractions of petroleum hydrocarbons whose components have small differences in boiling points; specifically our process may be utilized in the separation of mixtures of diolefins, olefins, and paraffins which are not readily separable by means of conventional fractional distillation. Other means may be employed to effect cooling of the feed plate vapors; for example, this object may be accomplished by inserting a cooling coil near the feed plate whereby condensation of the vapors is achieved within the column.

We claim:

1. In a process for effecting a separation of close-boiling aqueous mixtures of water-soluble oxygenated organic compounds by means of extractive distillation with water in a column having a stripping and a washing section therein whereby the relative volatilities of said compounds are modified, the improvement which comprises independently adjusting the liquid to vapor ratios of the components within said sections and increasing the relative volatilities of said compounds in said sections by introducing said mixture, at a temperature substantially below its boiling point, into said column to effect condensation of from about 10 to about 50 per cent of the vapors present in said column substantially at the point of the feed inlet.

2. The process of claim 1 in which the water-soluble oxygenated organic compounds to be separated are isopropyl and ethyl alcohols.

3. The process of claim 2 in which the water-soluble oxygenated organic compounds to be separated are methyl ethyl ketone and ethyl alcohol.

4. In a process for effecting separation of isopropyl alcohol from an aqueous mixture of ethyl alcohol by means of extractive distillation with water in a column having a stripping and a washing section therein whereby the relative volatilities of the aforesaid alcohols are modified, the improvement which comprises independently adjusting the liquid to vapor ratios of the components within said sections and increasing the relative volatilities of said alcohols in said sections by condensing a portion of the vapors present in the column substantially at the point of the feed inlet.

5. In a process for effecting separation of methyl ethyl ketone from an aqueous mixture of ethanol by means of extractive distillation of water in a column having a stripping and a washing section therein whereby the relative volatilities of the aforesaid ketone and alcohol are modified, the improvement which comprises independently adjusting the liquid to vapor ratios of the aforesaid compounds within said sections and increasing the relative volatilities of said ketone and alcohol in said sections by condensing a portion of the vapors present in the column substantially at the point of the feed inlet.

HOWARD GREKEL.
BENJAMIN S. PACE.
JOHN D. IRELAND.

References Cited in the file of this patent

UNITED STATES PATENTS

| Number | Name | Date |
|---|---|---|
| 2,290,442 | Metzl | July 21, 1942 |
| 2,379,110 | Souders | June 26, 1945 |
| 2,551,593 | Gilliland et al. | May 8, 1951 |

OTHER REFERENCES

Dunn et al., "Toluene Recovery by Extractive Distillation." Transactions, American Institute of Chemical Engineers, vol. 41, pages 631–644.

Robinson and Gilliland, "Elements of Fractional Distillation," published 1939 by McGraw-Hill Book Company, Inc., New York, N. Y., pages 82–93.